G. C. RAEGER.
EXPANSION AND FASTENING DEVICE.
APPLICATION FILED FEB. 6, 1918.

1,307,418.

Patented June 24, 1919.

WITNESSES

INVENTOR
George C. Raeger
BY
ATTORNEYS

UNITED STATES PATENT OFFICE.

GEORGE C. RAEGER, OF WATERLOO, NEW YORK.

EXPANSION AND FASTENING DEVICE.

1,307,418.

Specification of Letters Patent.  Patented June 24, 1919.

Application filed February 6, 1918.  Serial No. 215,597.

*To all whom it may concern:*

Be it known that I, GEORGE C. RAEGER, a citizen of the United States, and a resident of Waterloo, in the county of Seneca and State of New York, have invented a new and Improved Expansion and Fastening Device, of which the following is a full, clear, and exact description.

The invention relates to expansion and fastening devices, such as shown and described in the Letters Patent of the United States, No. 1,175,662, granted to me on March 14, 1916.

The object of the present invention is to provide a new and improved expansion device which is simple and durable in construction, cheap to manufacture and exceedingly pliable to readily adjust itself to irregularities that may be in the wall of the hole in which the device is used. Another object is to permit of providing an expansion device which is exceedingly serviceable for use in comparatively small holes. Another object is to permit the use of the expansion device in stone, concrete, wood, metal and other materials.

In order to accomplish the desired result, use is made of an expansible member adapted to be inserted in a hole of a structure and consisting of a wire cage having longitudinal members, and an expansion member engaging the cage interiorly and expanding the cage exteriorly against the wall of the hole.

A practical embodiment of the invention is represented in the accompanying drawings forming a part of this specification, in which similar characters of reference indicate corresponding parts in all the views.

Figure 1:
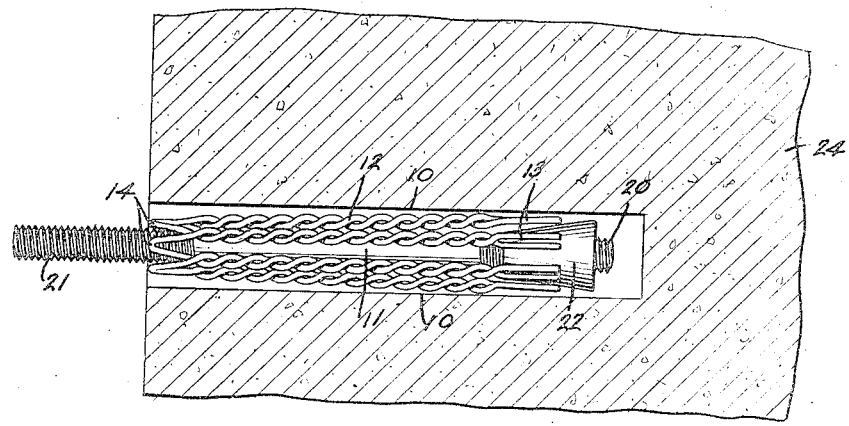
Figure 1 is a side elevation of the device as applied to a structure shown in section and with the cage in position prior to expanding it.

The expansion and fastening device consists essentially of two parts, namely, an expansible member 10 and an expansion and locking member 11. The expansible member 10 is in the form of an open-ended cage made of pieces of wire preferably doubled up and having one of its arms or shanks twisted sidewise with a corresponding arm or shank of another doubled-up piece, the several pieces being thus connected with each other to form a tubular cage open at both ends. As shown in the drawings, the shanks 12 are twisted together intermediate the ends thereof thus providing straight ends 13 at one end of the cage and V-shaped bends 14 at the other end of the cage. It will be noticed that by this arrangement the twists of the shanks 12 provide portions which are thicker than the ends 13 and 14.

Figure 2:
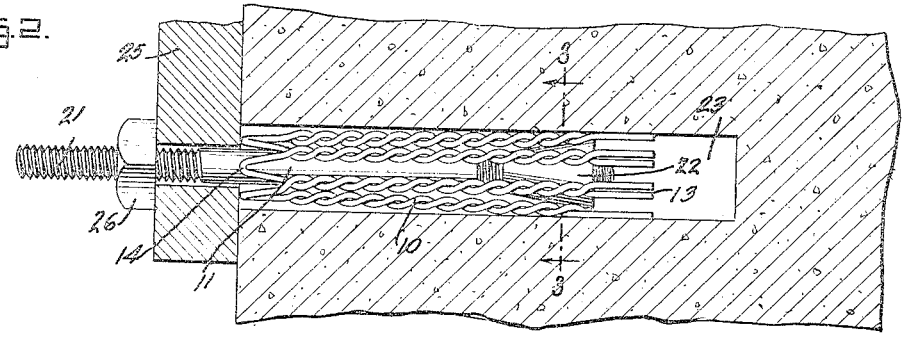
Fig. 2 is a similar view of the same with the cage expanded.
Figure 4:
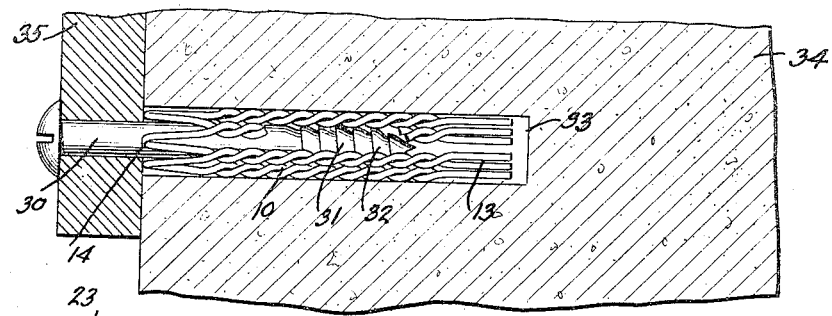
Fig. 4 is a side elevation of a modified form of the improvement as applied to a structure.
Figure 3:
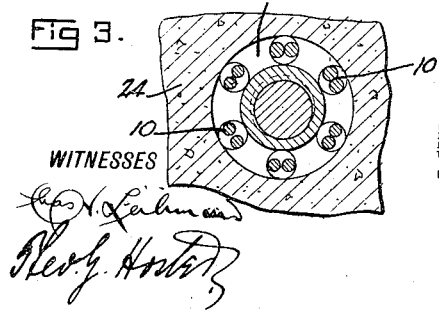
Fig. 3 is a cross section of the same on the line 3—3 of Fig. 2.

The expansion member 11, as shown in Figs. 1, 2 and 3, is in the form of a bolt having threaded ends 20 and 21, of which the threaded end 20 is engaged by a conical nut 22 adapted to pass into the opening of the cage 10 to expand the same and thus embed the twisted portions of the shanks 12 with the wall of the opening 23 of the structure 24 on which the device is to be used. The other threaded end of the bolt extends to the outside of the hole 23 and through the part 25 to be fastened in place, and on this threaded end 21 screws a nut 26 to securely fasten the part 25 to the face of the structure 24.

It will be noticed that when the expansion and fastening device is inserted in the hole 23, the cage 10 is contracted and readily passes into the hole 23, but when the bolt is drawn outward then the cone-shaped nut 22 passes into the inner end of the cage 10 and expands the same, thus forcing the twisted portions in firm contact with the wall of the hole 23, and securely fastening the expansion and fastening device in position on the structure 24. It will be noticed that after the cage has been expanded the bolt 11 may be unscrewed from the nut 22 and the latter left in expansion position within the cage 10. The bolt 11 may be reintroduced any time it is desired to do so, or replaced by another, if necessary.

Instead of a bolt for the expansion and locking member 11, use may be made of a screw 30 having a tapering end 31 provided with threads 32 adapted to engage the twists of the cage 10 to expand the same, and to engage the twists with the wall 33 of the structure 34. The head of the screw 30 serves to fasten the part 35 in position on the structure 34. It will be noticed that the threads or ridges 32 are comparatively flat to prevent cutting into the twists and injuring the same.

Figure 5:
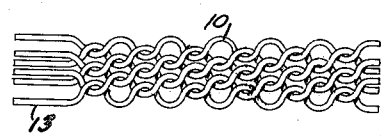
Fig. 5 is a side elevation of a portion of a cage formed of wires braided together.

In the form shown in Fig. 5 the cage 10 is composed of a plurality of small strands so connected as to define a mesh formation constituting a cage open at each end.

I do not limit myself to the particular form of the cage or the expanding member for the same, as the cage may be made in various shapes, but in each case the cage is made of pieces of wire twisted or braided or welded together or otherwise assembled to form an open-ended cage of cylindrical or other shape.

The cage shown and described is exceedingly flexible and can be readily expanded to fit irregularities that may be in the wall of the hole in which the device is used.

It will further be seen that the cage can be made comparatively small in diameter to permit the use of the device in very small holes.

By constructing the cage with the twists it can be readily used in stone, concrete, wood, metal or other materials.

Having thus described my invention, I claim as new and desire to secure by Letters Patent:—

1. An expansion and fastening device comprising an expansible member adapted to be inserted in a hole of a structure, and consisting of a wire cage having pairs of longitudinal strands connected laterally together at a series of points intermediate their ends, and an expansion member engaging the cage interiorly and expanding the cage exteriorly against the wall of the hole.

2. An expansion and fastening device, comprising an expansible member adapted to be inserted in a hole of a structure and consisting of a wire cage of approximately cylindrical shape and having longitudinal members twisted together, and an expansion member engaging the cage interiorly and expanding the said cage members against the wall of the hole.

3. An expansion and fastening device, comprising a tubular cage consisting of pairs of longitudinal strands laterally interlocked intermediate their ends, said cage being open ended.

4. An expansion and fastening device, comprising a cylindrical wire cage having its wall of abruptly reached thickness a distance from the end, and an expansion member engaging the said cage interiorly from the said end and encountering the cage wall at such thickness thereof.

5. An expansion and fastening device, comprising a cage formed of pieces of wire twisted together laterally a distance from one end, a bolt extending through the said cage, and a conical nut screwing on the said bolt and adapted to pass into the cage from the said end.

6. An expansion and fastening device, comprising an open-ended cage formed of pairs of wires having their shanks twisted laterally together intermediate the ends, and an expanding member adapted to pass into the said cage to expand the latter.

7. An expansion and fastening device, comprising an open-ended cage formed of pairs of wires having their shanks twisted laterally together intermediate the ends, a bolt extending through the cage, and a conical nut screwing in the bolt and adapted to pass into the cage from one end thereof.

8. In a device as characterized, an expansion member consisting of an open ended cage having its wall of network formation and of abruptly reached thickness a distance from the end, and adapted to be engaged interiorly by an expander at such thickness thereof.

9. In an expansion and fastening device, an expansible member adapted to be inserted in a hole of a structure and consisting of a wire cage of tubular form and having longitudinal members twisted together, said cage adapted to be expanded by longitudinal movement of an element of greater diameter than the interior diameter of the cage engaging the cage interiorly.

10. In an expansion and fastening device an open ended cage consisting of pairs of wires bent at approximately their longitudinal centers and folded to form pairs of wires, the legs of said pairs interlocked latterally at a series of points intermediate their ends.

GEORGE C. RAEGER.